July 19, 1949.　　　E. L. KELLS ET AL　　　2,476,304
APPARATUS FOR MEASURING OXYGEN

Filed Sept. 25, 1945　　　2 Sheets-Sheet 1

Inventors
Edward L. Kells
Delmar H. Larsen
By Lyon & Lyon
Attorneys

July 19, 1949.  E. L. KELLS ET AL  2,476,304
APPARATUS FOR MEASURING OXYGEN
Filed Sept. 25, 1945  2 Sheets-Sheet 2
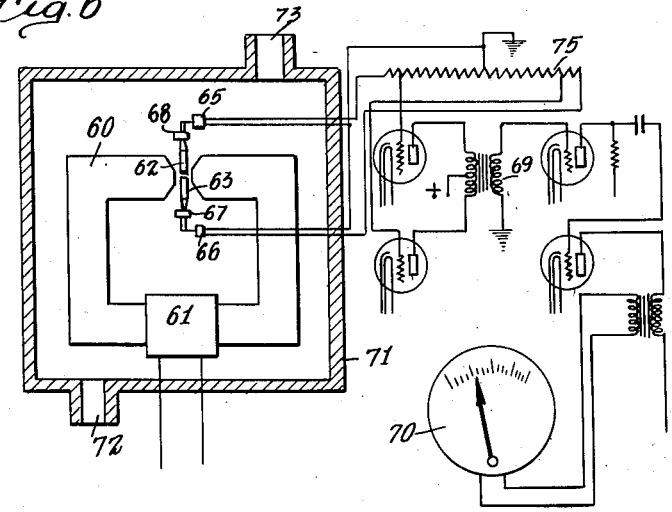
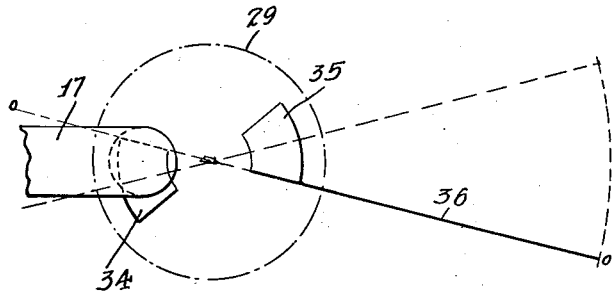
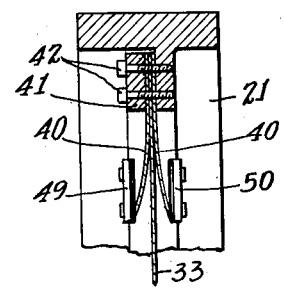
Inventors
Edward L. Kells
Delmar H. Larsen
By Lyon & Lyon
Attorneys Patented July 19, 1949

2,476,304

UNITED STATES PATENT OFFICE 2,476,304

APPARATUS FOR MEASURING OXYGEN

Edward L. Kells, Alhambra, and Delmar H. Larsen, Los Angeles, Calif.

Application September 25, 1945, Serial No. 618,492

7 Claims. (Cl. 175—183)

This invention relates to apparatus for detecting and measuring the oxygen when present in a gas, and refers particularly to an apparatus for detecting or measuring the oxygen content of a gas using the magnetic susceptibility of the gas. This application is a continuation in part of our copending application Serial No. 481,800, filed April 5, 1943, now abandoned.

In accordance with the present invention, means are provided for enclosing the gas whose oxygen content is to be determined. There is further provided means for generating a magnetic field of relatively high intensity within said enclosure, which magnetic field extends for an appreciable distance in a direction, or directions, normal to the lines of force. In said magnetic field there is provided a movable object or armature, said object being mounted for movement along a path which traverses the magnetic field at right angles to the lines of force thereof, said object having opposite terminations within regions of different field strengths. Resilient means are provided for restraining the movement of the object along its path, and depending upon the relative susceptibility of the object and the surrounding gas to be analyzed, forces of different value are applied to move the object against the action of the resilient means along its path. The object is connected directly with means for registering either these forces acting upon the object or the extent of the resulting movement of such object, which measurements may be calibrated to directly disclose the oxygen content of the gas.

By means of the present invention there is therefore provided a very simple and rugged instrument capable of substantially instantly indicating the oxygen content of gases.

The present invention also includes means for compensating the instrument in a very simple manner for the temperature variations and includes simple means for adjusting the instrument.

Further advantages of the apparatus of the present invention will be more fully understood from the following description of the drawings, in which there is illustrated the preferred forms of the invention.

In the drawing:

Figure 4 is a diagrammatic view of the polepieces used in the apparatus shown in Figs. 2 and 3.

Figure 5 is a section on the line 5—5 of Fig. 2; and

Figure 6 is a diagrammatic view of a modified form of the apparatus.

Figure 1:
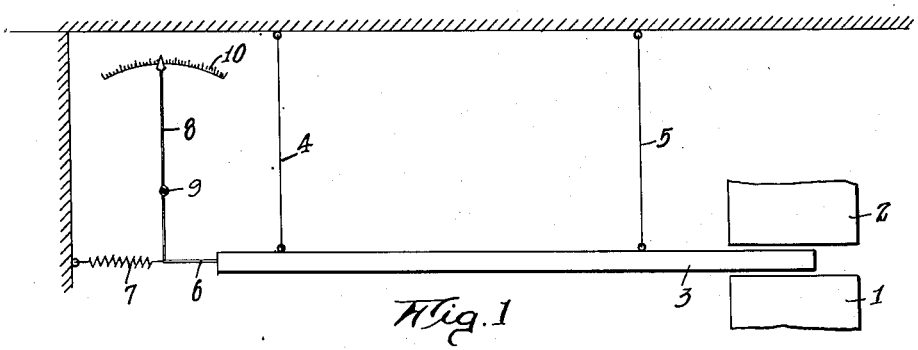
Figure 1 is a diagrammatic view of a simplified form of the apparatus of the present invention.

Referring first to Figure 1 of the drawing, the apparatus comprises a magnet having polepieces 1 and 2. There is provided an object or armature 3 suspended by suitable means, such as links 4 and 5, so that one of the ends is between the polepieces 1 and 2 and its other end is spaced therefrom. The armature 3 may be of rectangular or square cross-section when viewed at right angles to Figure 1. As illustrated, the magnet and the polepieces 1 and 2 may be a permanent magnet. The object 3 is connected by a link 6 to a spring 7 and an indicating needle 8 is provided pivoted at 9 and movable over the graduated scale 10. The needle 8 is held against the link 6 by the spring, with the spring thus acting as a force-measuring spring for the system. The object 3 is preferably made to have a magnetic susceptibility less than the minimum susceptibility of the gaseous mixture to be analyzed. Suitable means (not shown) are provided for enclosing the gaseous mixture to be analyzed within the space containing the polepieces 1 and 2 and the object 3.

With such an apparatus, the operation of the device is as follows: The force tending to push the object 3 out of the gap between the polepieces 1 and 2 varies directly as the difference in magnetic susceptibility of the gas in the gap and the magnetic susceptibility of the object. The magnetic susceptibility of the gas varies with the oxygen concentration in the gas, as more fully explained in our copending application previously referred to.

The force acting on the object 3 presses it against the depression spring 7 until this resistance is equal to the force, at which time the position of the pointer 8 is indicative of the oxygen content.

Figure 2:
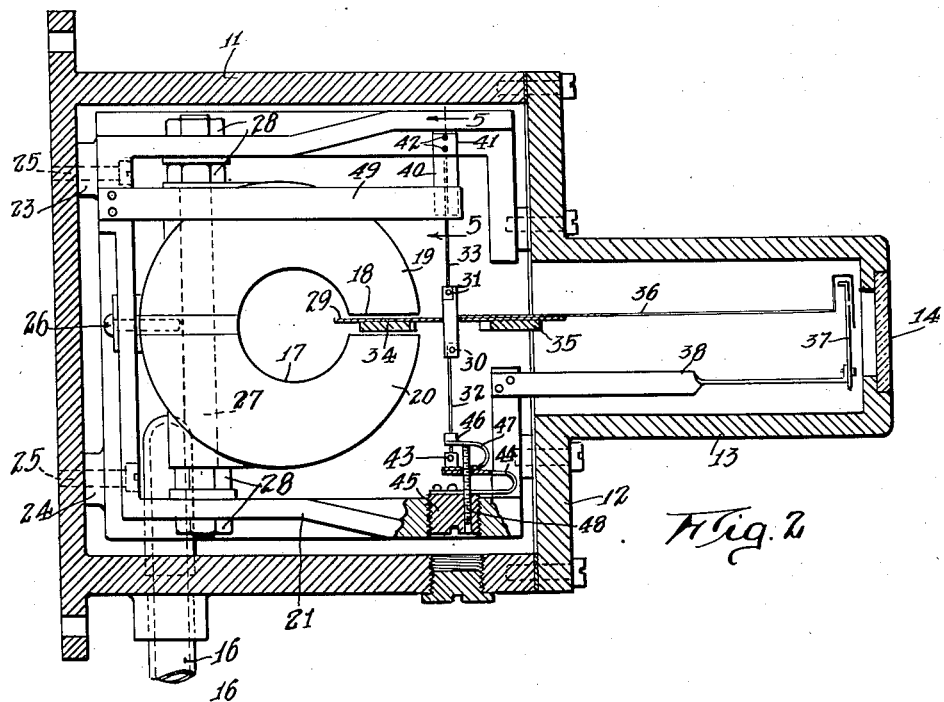
Figure 2 is an elevation, mainly in section, of the preferred form of the invention.
Figure 3:
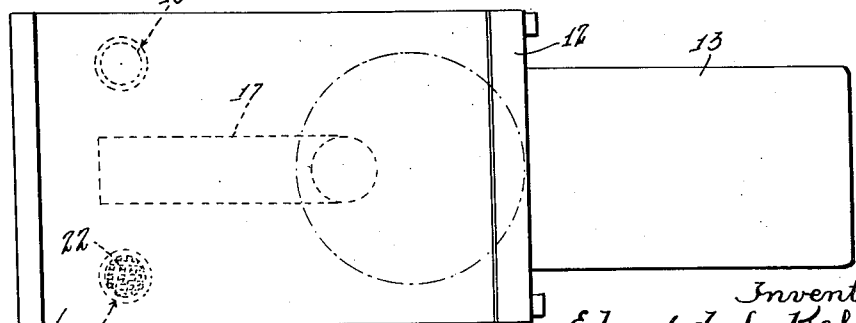
Figure 3 is a top view of the apparatus shown in Fig. 2.

Now referring more particularly to Figures 2, 3 and 4 of the drawings, a preferred form of the instrument, embodying the principles more or less diagrammatically indicated in connection with Figure 1, is illustrated. In this device 11 indicates a casing open at the right side, as viewed in Figures 2 and 3. The casing is provided with a closure member 12 which is provided with an extension 13, the end face of which is provided with a glass window 14. The casing 11 provides a rectangular enclosure for holding the gas, the oxygen content of which is to be determined. Preferably, as indicated, the casing 11 is provided with an inlet 15 and an exit 16 for the gas so that the apparatus may be employed for continuously measuring the oxygen content of a stream of gas flowing through the apparatus. A filter 22 is shown at the inlet 15 for filtering foreign matter from the gas to be analyzed.

Within the enclosure is provided a magnet 17, preferably a permanent magnet adapted to provide a high field strength across the gap 18 between its polepieces 19 and 20. As indicated, the magnet is generally of toroidal shape, preferably enlarged in cross-section at the opposite side from the gap 18.

The magnet 17 is preferably centrally disposed within the space provided by the casing 11 and for mounting the magnet 17, as well as other elements of the instrument, there is provided a rectangular frame 21. The rectangular frame is provided with bosses 23 and 24 through which extend bolts 25 into the left side wall of the casing 11 for holding the frame within the casing. The left side of the magnet 17, as viewed in Figure 2, is bolted as indicated at 26 to the frame, and there is also provided a bolt 27 extending through the left side of the magnet and clamped to the frame by nuts 28.

A disc 29 of light-weight metallic material, such, for example, as aluminum, is used to fasten tabs 30, 31 in a horizontal position by torsion wires 32, 33. Affixed to the disc 29 is the object 34 in the form of a segmental block which occupies the position indicated in Figure 4 when the magnetic susceptibility of the gas undergoing measurement is at a minimum. A counter-balance block 35 is placed opposite the object 34 and is of such weight and in such position as to bring the suspended system into static balance. Also attached to the disc 29 is a pointer 36, the end of which is movable over a scale 37 which is graduated to indicate the oxygen content of the gas within the testing apparatus. The scale 37 is indicated on a support 38 on the right-hand member of the frame 21.

The block 34 is composed of material which has a magnetic susceptibility approximately within the range of the gases to be measured. Generally the volume susceptibility of the block 34 is within the limits of $-10 \times 10^{-9}$ to $+150 \times 10^{-9}$ C. G. S. units. Thus the block may, for example, be composed of a diamagnetic plastic containing finely divided aluminum in suitable proportions. The torsion wires 32 and 33 are in the form of rolled strips and at their upper and lower extremities are restrained from rotation in the case of the upper strip 33 by two arcuate strips 40 of spring material (Fig. 5), which pieces of spring material 40 are held to the upper frame member by a clamping block 41 and screws 42. In the case of the lower strip 32, the lower end of the strip is fixed by the tab 43 to the end of a spring 44 mounted by the plug 45 which in turn is screw-threaded into the lower frame member. The lower strip, however, is effectively held from rotation by a contact 46 on the end of a supplemental spring member 47, and there is provided an adjustment screw 48 for vertically moving the position of the contact member 46 for the purpose of establishing a standardized torsional modulus for the system composed of wires 32 and 33. The spring 44 maintains sufficient tension in the torsion wires so that they are at all times taut. A zero adjustment is provided by rotating the plug 45 in order to place the pointer 36 at the correct position on the scale for the then present gas.

Temperature compensation is provided by two bimetallic arms 49 and 50, one end of which is fastened to the left end of the frame member; the other end of which contacts the pieces of spring material 40. Such ends of the bimetallic strips 49 and 50 move toward each other for a decrease in temperature, thus shortening the effective length of the upper torsion wire 33.

The operation of the apparatus shown in Figures 2 to 5, inclusive, is as follows: As indicated particularly in Figure 4, the block 34 is so placed in the magnetic gap 18 that any difference in the magnetic susceptibility between the material of the block 34 and the gas in the gap will tend to push the block out of the gap or to pull it in, depending upon the difference being negative or positive, this pulling or pushing being resisted by the element to be balanced by the torsion wires 32 and 33. The limit of the movement of the block is such that the end of the block in the magnetic gap sweeps through a field of substantially constant strength giving approximately a linear scale which may be calibrated in terms of volume percentage of oxygen. The aluminum disc extends through the magnetic gap at all times so that no magnetic forces are exerted on the disc itself when it is at rest. When in motion any current generated in the disc would serve to damp the rotation.

As the temperature increases the mass of gas per unit volume decreases and the susceptibility of the oxygen decreases, both in direct proportion to the absolute temperature. Additionally most permanent magnets exhibit some change in their field strength with a change in temperature. Compensation for the algebraic sum of these changes with temperature must be made in order that the instrument be accurate for normal temperature conditions. The bimetallic strips 49 and 50 and the spring strip 40 are so arranged as to provide this compensation.

The particular apparatus illustrated in Figures 2 to 5 in the drawing has the advantage that large forces are generated for operating the instrument and sufficient energy obtained to provide directly the rotational and linear forces necessary to move the indicating elements of the apparatus.

Now referring more particularly to Figure 6 of the drawing, the apparatus there illustrated is shown as comprising an electromagnet 60 which is excited by an alternating current coil 61. The polepieces in this instance are shaped to give the maximum field strength in a relatively small space between them; the gradient of field strength is of not particular importance. There are inserted in the field between the polepieces two objects or rods 62 and 63 which almost touch in the strongest part of the field. These rods are maintained in substantially constant cross-sectional area until the limit of the strongest portion of the magnetic field is reached, whereupon they taper outwardly and terminate at the needles of two ordinary pickups 65 and 66, such as are used for phonograph record reproductions. The rods are positioned by supports 67 and 68 which may be rubber collars, or the like. The two pickups are connected to an amplifier, at least the first stage of which is a push-pull stage, and the basic constituents of which are diagrammatically indicated in the figure. The pickups are connected with respect to polarity so that when both rods are mutually repelled or mutually attracted, the two grids of the first stage are given opposite polarities so that an impulse results in the secondary of the transformer 69. Conversely, with such an arrangement movement of the two rods in the same direction, with unchanged mutual separation, will result in changes in primary currents in the transformer 69 which cancel each other and give no impulse. Potentiometer 75 can be adjusted to cancel out inequalities between the two outputs. An alternating current output meter 70 is placed across the output of the amplifier which may of course contain more stages of amplification than shown, if necessary. The output meter 70 is calibrated in units of oxygen partial pressure. An enclosure 71 is placed around the electromagnet and is provided with an inlet 72 and an outlet 73, whereby the enclosure may be readily filled with the gas to be tested.

The rods 62 and 63 are constructed of a hard, durable substance having a susceptibility which, for best results, is just beyond the range of that of the gases to be tested. A suitable material is aluminum-zinc alloy containing about 45% zinc, or a platinum tube containing a close fitting antimony rod, a suitable mutual proportions. A glass or plastic rod containing a core of a sufficient proportion of paramagnetic material, such as platinum, aluminum, tourmaline, ebonite, and the like, may be used. Of these, those which do not conduct electricity throughout the mass are preferable because damping by eddy currents is thereby avoided. Preferably the volume susceptibility of the rod or rods 62 and 63 is equal to or slightly beyond either limit of the range of susceptibility covered by the range of oxygen content to be measured.

The mode of operation of the apparatus illustrated in Figure 6 is as follows: When a gas more paramagnetic than the rods 62 and 63 surrounds the latter, the rods will tend to move out of the magnetic field which, of course, occurs when the magnet is excited by current during a portion of the alternating-current cycle. When the magnetic field is zero, as occurs approximately at the time when the alternating current is changing direction, the tendency to move out of the field will cease, and the rods will spring back into place. When the current is reversed during the second half of the cycle, the magnetic field will again rise to a maximum and the rods will be repelled. Thus if the current energizing the magnet has a frequency of 60 cycles per second, the rods will vibrate 120 cycles per second. If the gas is less paramagnetic than the rods, the latter will tend to move into the field during the period when the magnetic field is present.

Now the force attracting or repelling the rods, other variables being unchanged, is directly proportional to the algebraic difference of the volume susceptibilities of the gas and the rod, and therefore a direct function of the oxygen content of the gas. Since the E. M. F. developed by the pickups is a function of that force, and can be suitably amplified and transformed into a meter reading, the ability of this device to read oxygen directly is at once apparent. The meter may be of the indicating type or the recording type.

While the particular forms of the invention herein described are well adapted to carry out the objects of the present invention, it is to be understood that the present invention is of the scope set forth in the appended claims.

We claim:

1. An apparatus for determining the oxygen concentrations in a gas mixture, comprising means forming a gas-enclosing chamber, a magnet having a gap within said chamber, a rotatable armature-supporting member mounted on torsion wires, said torsion wires being disposed external of the gap, said member supporting an armature movable in said gap, indicating means connected to said member to register the rotation of said member as an indication of the oxygen content of the gaseous mixture within said chamber, and temperature compensating means connected to said torsion wires.

2. An apparatus for determining the oxygen concentrations in a gas mixture, comprising means forming a gas-enclosing chamber, a magnet having a gap within said chamber, a rotatable armature-supporting member mounted on torsion wires, said torsion wires being disposed external of the gap, said member supporting an armature movable in said gap, indicating means connected to said member to register the rotation of said member as an indication of the oxygen content of the gaseous mixture within said chamber, temperature compensating means connected to said torsion wires, and means for maintaining said torsion wires under tension.

3. An apparatus for determining the oxygen concentrations in a gas mixture, comprising means forming a gas-enclosing chamber, a magnet having a gap within said chamber, an armature-supporting disc mounted for rotation on torsion-resisting wires, said member supporting an armature movable in said gap, indicating means connected to said member to register the rotation of said member as an indication of the oxygen content of the gaseous mixture within said chamber, and means for compensating for temperature variation for gas, said means including bimetallic strips for changing the effective length of the torsion wires.

4. An apparatus for determining the oxygen concentrations in a gas mixture, comprising means forming a gas-enclosing chamber, a magnet having a gap within said chamber, an armature-supporting disc mounted for rotation on torsion-resisting wires, said member supporting an armature movable in said gap, indicating means connected to said member to register the rotation of said member as an indication of the oxygen content of the gaseous mixture within said chamber, means for compensating for temperature variation for gas, said means including bimetallic strips for changing the effective length of the torsion wires, and means for maintaining the torsion wires under tension.

5. An apparatus for determining the oxygen concentrations in a gas mixture, comprising means forming a gas-enclosing chamber, a magnet having a gap within said chamber, an armature-supporting disc mounted for rotation on torsion-resisting wires, said member supporting an armature movable in said gap, indicating means connected to said member to register the rotation of said member as an indication of the oxygen content of the gaseous mixture within said chamber, means for compensating for temperature variation for gas, said means including bimetallic strips for changing the effective length of the torsion wires, and means for independently adjusting the length of the torsion wires.

6. An apparatus for determining the oxygen content of a gas, comprising a casing for enclosing the gas the oxygen content of which is to be measured, a magnet having a gap disposed within said casing, a rotatable disc supported on torsion mounting means and mounting an armature movable in said gap, said armature thereby being movable in directions perpendicular to the lines of force of said magnet and having different end faces located in regions of different field strengths, indicating means connected to said disc for indicating the rotation thereof as an indication of the oxygen content of the gaseous mixture within said chamber, and bimetallic temperature compensating members connected to the torsion mounting of said disc.

7. An apparatus for determining the oxygen content of a gas, comprising a casing, for enclosing the gas the oxygen content of which is to be measured, a magnet having a gap disposed within said casing, a rotatable disc supported on torsion mounting means and mounting an armature movable in said gas, said armature thereby being movable in directions perpendicular to the lines of force of said magnet and having different end faces located in regions of different field strength, indicating means connected to said disc for indicating the rotation thereof as an indication of the oxygen content of the gaseous mixture within said chamber, and means for adjusting the effective length of the torsion means mounting said disc.

EDWARD L. KELLS.
DELMAR H. LARSEN.

REFERENCES CITED

The following references are of record in the file of this patent:

UNITED STATES PATENTS

| Number | Name | Date |
| --- | --- | --- |
| 1,539,452 | Wilson | May 26, 1925 |
| 1,564,933 | Brown | Dec. 8, 1925 |
| 1,746,627 | Babbitt | Feb. 11, 1930 |
| 2,104,743 | Herrick | Jan. 11, 1938 |
| 2,416,344 | Pauling | Feb. 25, 1947 |

OTHER REFERENCES

Magnetic Phenomena by Williams, first edition, McGraw-Hill Book Company, Inc., pages 93 to 96. Copy in Div. 48.